United States Patent
Baijnauth et al.

(10) Patent No.: US 10,580,069 B1
(45) Date of Patent: Mar. 3, 2020

(54) METHOD AND SYSTEM FOR IMPLEMENTING A MESSAGING FORMAT VALIDATOR TOOL

(71) Applicant: JPMorgan Chase Bank, N.A., New York, NY (US)

(72) Inventors: Gavindra Baijnauth, Seffner, FL (US); Michael J. Barry, Lithia, FL (US); Daniel R. Norstrand, Tampa, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 241 days.

(21) Appl. No.: 15/622,464

(22) Filed: Jun. 14, 2017

Related U.S. Application Data (60) Provisional application No. 62/352,187, filed on Jun. 20, 2016.

(51) Int. Cl.
| | |
|---|---|
| *G06F 17/30* | (2006.01) |
| *G06Q 40/02* | (2012.01) |
| *H04L 12/58* | (2006.01) |
| *G06F 16/21* | (2019.01) |
| *G06F 16/23* | (2019.01) |

(52) U.S. Cl.
CPC ........... *G06Q 40/02* (2013.01); *G06F 16/213* (2019.01); *G06F 16/2365* (2019.01); *H04L 51/30* (2013.01)

(58) Field of Classification Search
CPC ....... G06Q 40/02; G06F 16/213; G06F 16/23; G06F 16/2365; G06F 16/2379; G06F 16/2393; H04L 51/30
See application file for complete search history.

(56) References Cited

U.S. PATENT DOCUMENTS

| | | | |
|---|---|---|---|
| 9,092,493 B2* | 7/2015 | Seto | G06F 16/254 |
| 2007/0165625 A1* | 7/2007 | Eisner | G06F 9/546 |
| | | | 370/389 |
| 2010/0211499 A1* | 8/2010 | Zanzot | G06Q 20/10 |
| | | | 705/40 |
| 2011/0258115 A1* | 10/2011 | Mulhim | G06Q 20/108 |
| | | | 705/42 |
| 2013/0339187 A1* | 12/2013 | Carter | G06Q 20/102 |
| | | | 705/26.41 |
| 2016/0078066 A1* | 3/2016 | Baralay | G06F 19/321 |
| | | | 707/809 |

* cited by examiner

*Primary Examiner* — Greta L Robinson
(74) *Attorney, Agent, or Firm* — Hunton Andrews Kurth LLP (57) ABSTRACT

The invention relates to a Validator Tool that validates a messaging format standard. The Validator Tool comprises: a processor configured to perform the steps comprising: identifying a change in a messaging format specific to transmission of financial information from a first entity to a second entity; identifying a first event and a second event; identifying a first schema associated with the first event and a second schema associated with the second event; the first event in the first schema represent a message prior to the change in the messaging format and the second event in the second schema represents a message that incorporates the change in the messaging format; and performing a comparison of the first event and the second event, wherein the comparison comprises one or more of: missing accounts, missing pages and an event message comparison.

20 Claims, 7 Drawing Sheets

| Event 1 | Event 2 |
|---|---|
| 869576 | 864559 |
| COREINTB ▾ | COREINTB ▾ |
| Compare Events | Reset Events |

Missing Accounts in Event 1:
11002177
11015039
32280201
37624906
41280556
41280569
41287531
41536901

Missing Accounts in Event 2: *None*

Missing Pages in Event 1: *None*

Missing Pages in Event 2:
24457901:[2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72]
24457902:[2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42]
24457905:[2, 3, 4, 5, 6, 7, 8, 9, 10]
24457906:[2, 3, 4, 5, 6, 7]
24457913:[2]
41303932:[2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41]

| Compare Events | Reset Events |

Missing Accounts in Event 1: None    Missing Accounts in Event 2: None

Missing Pages in Event 1: None    Missing Pages in Event 2: None

Event 1 Messages:
Acct 5447704575 - Page 1 - S940
/ 710

:20:MT940/050616/018
:25:930 1 011484
:28C:00088/00018
:60M:C160506USD2210106405,88
:61:160506CD3000000,00NTRFO/B CBANK NYC//7888000127FC
:86:FROM CBANK N.A. NEW YORK NY 10043-0001 VIA PSN/SSN
0169361/414
88 TIME RECVD 04 58 PM B/O 5224000A25 THOMAS SMITH, THOMAS
SMITH1200 RIDGE PARKWAYSUITE 100 SOUTH B/O CGROUP G
MARKETS INC. NEW YORK NY 10001 BK INFO /REC/029005380
THOMAS E SMITH
:61:160506CD2958962,21NTRFO/B CBANK NYC//8923091247FF
:86:FROM 021000089 CBANK N.A. NEW YORK NY 10043-0001 VIA
IMAD 0506 B1Q8021C033045D TIME RECVD 03 40 PM B/O 36072508
SOMO MIT TRUST BANK (U.S.A.) HOBOKEN NJ 07030 B/O CBANK N.A.
NEW YORK NY 10043-0001 BK INFO /RFB/GMAN BANKS PAIR OFF /
TIME/15 37

Event 2 Messages:

:20:MT940/050616/018
:25:930 1 011500
:28C:00088/00018
:60M:C160506USD2210106405,88
:61:160506CD3000000,00NTRFO/B CBANK NYC//7888000127FC
:86:FROM CBANK N.A. NEW YORK NY 10043-0001 VIA PSN/SSN
0169361/414
88 TIME RECVD 04 58 PM B/O 5224000A25 THOMAS SMITH, THOMAS
SMITH1200 RIDGE PARKWAYSUITE 100 SOUTH B/O CGROUP G
MARKETS INC. NEW YORK NY 10001 BK INFO /REC/029005380
THOMAS E SMITH
:61:160506CD2958962,21NTRFO/B CBANK NYC//8923091247FF
:86:FROM 021000089 CBANK N.A. NEW YORK NY 10043-0001 VIA
IMAD 0506 B1Q8021C033045D TIME RECVD 03 40 PM B/O 36072508
SOMO MIT TRUST BANK (U.S.A.) HOBOKEN NJ 07030 B/O CBANK N.A.
NEW YORK NY 10043-0001 BK INFO /RFB/GMAN BANKS PAIR OFF /
TIME/15 37

FIGURE 7

METHOD AND SYSTEM FOR IMPLEMENTING A MESSAGING FORMAT VALIDATOR TOOL

CROSS REFERENCE TO RELATED APPLICATIONS

The application claims priority to U.S. Provisional Application 62/352,187, filed Jun. 20, 2016, the contents of which are incorporated herein in its entirety.

FIELD OF THE INVENTION

The present invention generally relates to a validator tool and more specifically to a validator tool that identifies changes in a financial message standard, specifically Swift messages.

BACKGROUND OF THE INVENTION

Currently, applications have to make changes periodically to keep up with Swift Standards. Swift is a company that provides a hub for banks and larger corporations to communicate in a standard format account balances and transactions. Any application responsible for producing Swift messages has to validate there were no negative impacts/defects when making changes. Any negative impact is costly as such applications are dealing with money movements.

SWIFT stands for the Society for Worldwide Interbank Financial Telecommunications. It is a messaging network that financial institutions and banks use to securely send and receive information and instructions through a standardized system of codes. SWIFT assigns each financial organization a unique code that has either eight characters or 11 characters. The code is called interchangeably the bank identifier code (BIC), SWIFT code, SWIFT ID, or ISO 9362 code.

Periodically, SWIFT will produce releases that incorporate changes to certain Swift statements. There is a problem today when applications make changes to these statements because there is no product or tool that allows the development team to compare statements before and after in an accurate manner. As a result, development teams are not able to address the true impact of a change without visually seeing what other portions of the statements were impacted.

These and other drawbacks exist.

SUMMARY OF THE INVENTION

Accordingly, one aspect of the invention is to address one or more of the drawbacks set forth above. According to an embodiment of the present invention, a computer implemented Validator Tool validates a messaging format standard and comprises: a memory component that stores financial messaging data; an interactive interface that provides a comparison of at least two events; and a processor, coupled to the memory component and the interactive interface, the processor configured to perform the steps comprising: identifying a change in a messaging format specific to transmission of financial information from a first entity to a second entity; identifying a first event and a second event; identifying a first schema associated with the first event and a second schema associated with the second event; the first event in the first schema represent a message prior to the change in the messaging format and the second event in the second schema represents a message that incorporates the change in the messaging format; and performing a comparison of the first event and the second event, wherein the comparison comprises one or more of: missing accounts, missing pages and an event message comparison.

According to another embodiment of the present invention, a computer readable medium containing program instructions for validating a messaging format standard, wherein execution of the program instructions by one or more processors of a computer system causes the one or more processors to carry out the steps of: identifying a change in a messaging format specific to transmission of financial information from a first entity to a second entity; identifying a first event and a second event; identifying, via a processor, a first schema associated with the first event and a second schema associated with the second event; the first event in the first schema represent a message prior to the change in the messaging format and the second event in the second schema represents a message that incorporates the change in the messaging format; and performing, via an interactive interface, a comparison of the first event and the second event, wherein the comparison comprises one or more of: missing accounts, missing pages and an event message comparison.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 7 is an exemplary interface that illustrates a Validator Tool, according to an embodiment of the present invention.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Validator Tool that identifies changes in a standard messaging format to exchange data, such as financial information.

According to an embodiment of the present invention, the Validator Tool may identify changes in Swift messages and a corresponding impact of the changes. The Validator Tool provides efficiency and speed needed to validate hundreds and thousands of Swift statements to assess the full impact of any change.

Swift statements generally represent statements that are formatted against strict rules and guidelines. Accordingly, any bank or customer who wants to communicate via a Swift statement will always have the same format once they follow the standards.

For example, a financial institution or other entity may have many applications that receive and generate Swift related messages. Accordingly, each instance of such applications will need to be updated to accommodate various changes and updates. Within a company, such as a financial institution, there could be many instances of impacted applications and systems.

An embodiment of the present invention is directed to a Validator Tool that compares each TAG for TAG on a statement and generates an interactive report with detailed analysis. The innovative tool may then pinpoint which field in the tag is different or affected by an update. This allows a development team (or other user) to assess the impact of the change at a broader level.

According to an embodiment of the present invention, the Validator Tool compares mass amounts of Swift statements and is further expandable to clients, others users and applications. For example, the Validator Tool may present the impact of a change to the client.

Figure 1:
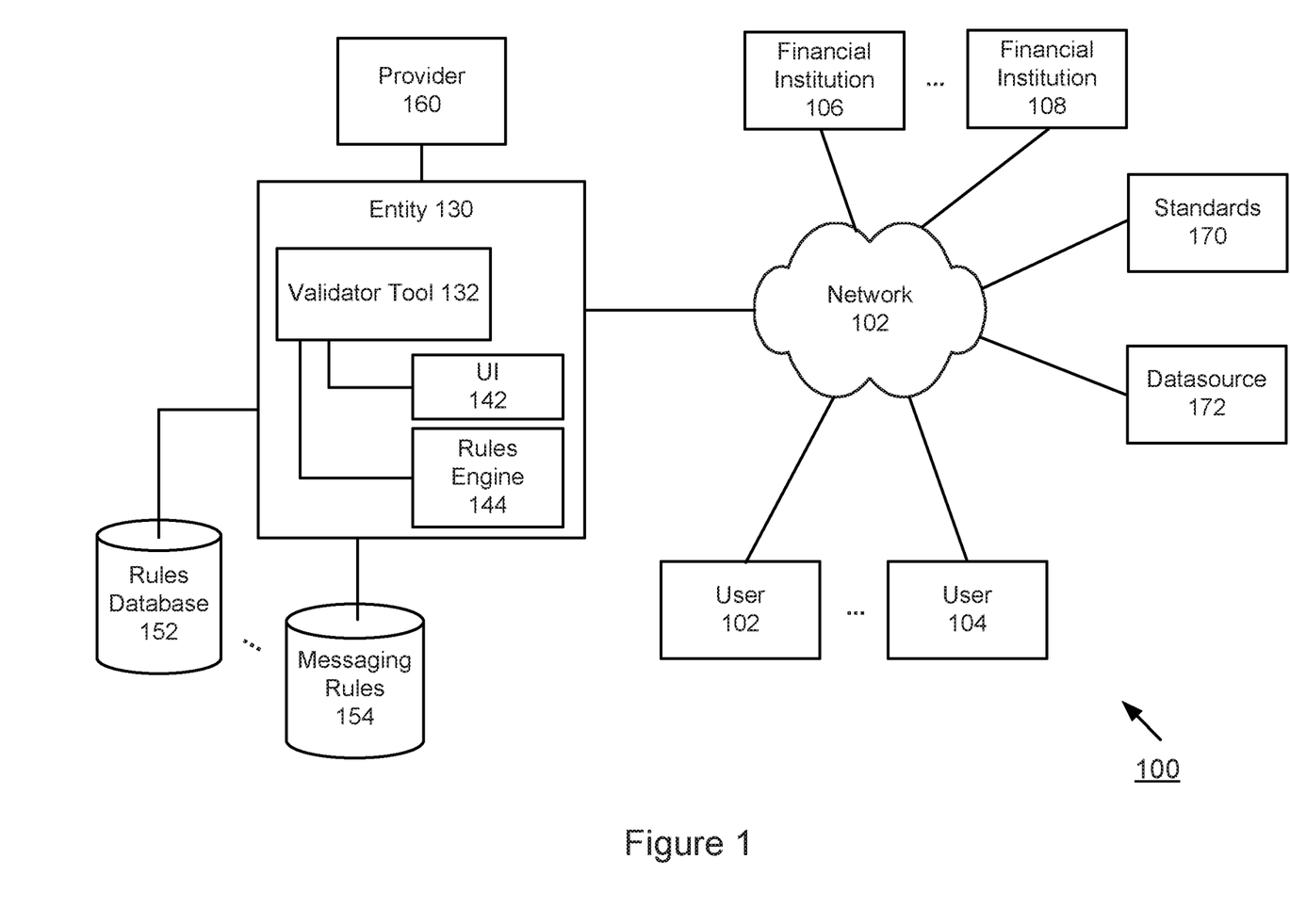
FIG. 1 illustrates a schematic diagram of a system that implements a Validator Tool, according to an embodiment of the present invention.

FIG. 1 illustrates a schematic diagram of a system that implements a Validator Tool, according to an embodiment of the present invention. As illustrated in FIG. 1, Network 102 may be communicatively coupled with one or more data devices including, for example, computing devices associated with end users, represented by User 102, 104. Such devices may include mobile devices, including mobile phones, smart devices, etc. Entities, such as Financial Institutions 105, 108 may communicate with Entity 130 via Network 102, where financial statements, in a particular format such as Swift, may be transmitted and/or received. Entity 130 may include a Validator Tool 132 that automates and facilitates validation and comparison functionality in accordance with the various embodiments of the present invention. Validator Tool 132 may also incorporate modules and other functions, such as User Interface 142 and Rules Engine 144. These modules are exemplary and illustrative, Validator Tool 132 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Rules data may be stored and managed by local storage represented by Databases 152, 154. For example, Rules Database 152 may maintain rules directed to validation and comparing before and after statements. Messaging Rules 154 may maintain updates and other changes relating to rules specific to a transmission format. Messaging Rules 154 may also receive updates from Standards 170, Datasource 172 and/or other source. Also, Databases 152, 154 may also store and maintain indexes, attachments, archived data, reports, performance data, code, etc. The validator and comparison features described herein may be provided by Entity 130 and/or a third party provider, represented by 160, where Provider 160 may operate with Entity 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102 may be a wireless network, a wired network or any combination of wireless network and wired network. For example, Network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 102 may support an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks mentioned above.

Data may be transmitted and received via Network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5

Ethernet connection, a fiber connection, a cable connection or other wired network connection.

While FIG. 1 illustrates individual devices or components, it should be appreciated that there may be several of such devices to carry out the various exemplary embodiments. Entity 130 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Entity 130.

Entity 130 may be communicatively coupled to Databases 152, 154. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 102, or communications may involve a direct connection between the various storage components and Entity 130, as depicted in FIG. 1. The storage components may also represent cloud or other network based storage.

Figure 2:
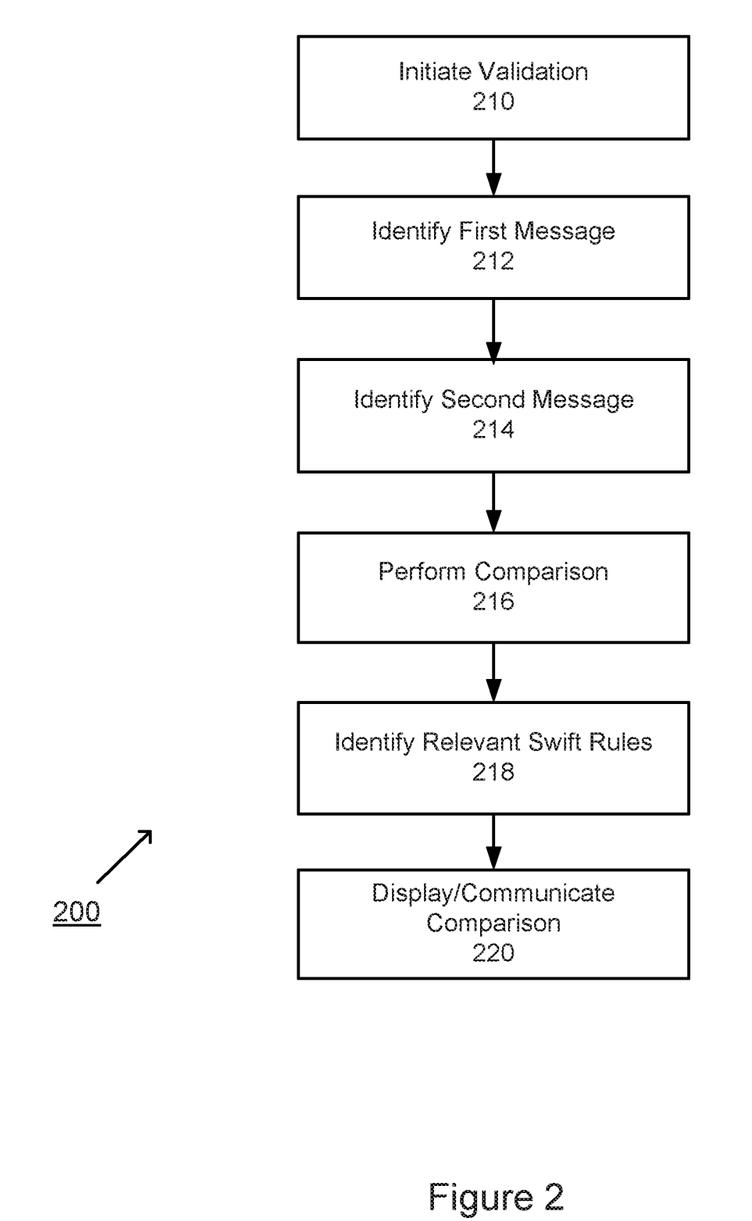
FIG. 2 is an exemplary diagram of a method for implementing a Validator Tool, according to an embodiment of the present invention.

FIG. 2 is an exemplary diagram of a method for implementing a Validator Tool, according to an embodiment of the present invention. At step 210, a validation feature may be initiated. At step 212, a first message may be identified. At step 214, a second message may be identified. At step 216, a comparison may be performed. At step 218, relevant rules may be identified. At step 220, comparison details may be displayed, communicated and/or shared. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a validation feature may be initiated. An embodiment of the present invention is directed to a standard messaging format for banks and companies to exchange financial information, such as Swift. The validation feature may be particularly useful when there is an update or change in the messaging standard. The standard may mandate that a particular field and a particular tag needs to be changed to meet the standard. According to current practices, the change is made without realizing the impact of a particular change. For example, when an entity makes the change to the messaging standard in production, the change may impact other current statements. When changes are initiated and addressed, a client or end user may not be able to match the change thereby leading to inconsistencies and problems. An embodiment of the present invention is directed to comparing a statement before and after the change, where the system is able to identify tags that are directly and even indirectly affected by the change in the standard. For example, the system may identify a particular tag that was changed and how the statements are different. In addition, the system may identify an effect of the change (e.g., positive change, negative change, neutral, etc.) to a particular entity, line of business, group, etc.

An embodiment of the present invention is directed to validating on multiple levels. The Validator Tool may identify differences in statements at a tag level as well as the actual data within the tags. The Validator Tool further identifies a source of the data, e.g., where it came from, upstream feeder, what table the data is currently housed in, etc. The Validator Tool may make comparisons for various applications that create statements subject to a messaging standard within an entity. For example, an entity may have multiple applications that receive and/or transmit statements using a messaging format. The Validator Tool may also identify trends and areas that may need additional attention and updates.

At step 212, a first message may be identified. The first message may represent a financial statement in a particular schema.

At step 214, a second message may be identified. The second message may represent a financial statement in a particular schema.

At step 216, a comparison may be performed. The comparison may be made between the first message and the second message. For example, the first message may represent a statement before a change in the messaging format and the second message may represent the statement after the change in the messaging format.

The user may generate Swift statements to be used for testing (at a before state, with no code changes). The user may then apply the code changes and generate Swift statements again (after state, with code changes). An embodiment of the present invention provides the comparison between the two stages of Swift statements.

For example, an entity may identify changes to a messaging format and implement such changes in various applications within the entity. The Validator Tool may automatically generate a statement prior to the change and a statement after the implemented change. The Validator Tool may then perform a comparison that compares each tag and the data for each tag. As a result, the Validator Tool may identify changes as they affect a particular statement. For example, the Validator Tool may identify that there is a difference in Tag 20 and the subfields are different and further identify specifically the differences.

At step 218, relevant rules may be identified. Based on the comparison, an embodiment of the present invention may identify relevant rules that are affected.

At step 220, comparison details may be displayed, communicated and/or shared. The Validator Tool may identify specific tags, data within the tags, relevant systems, applications, etc.

Figure 3:
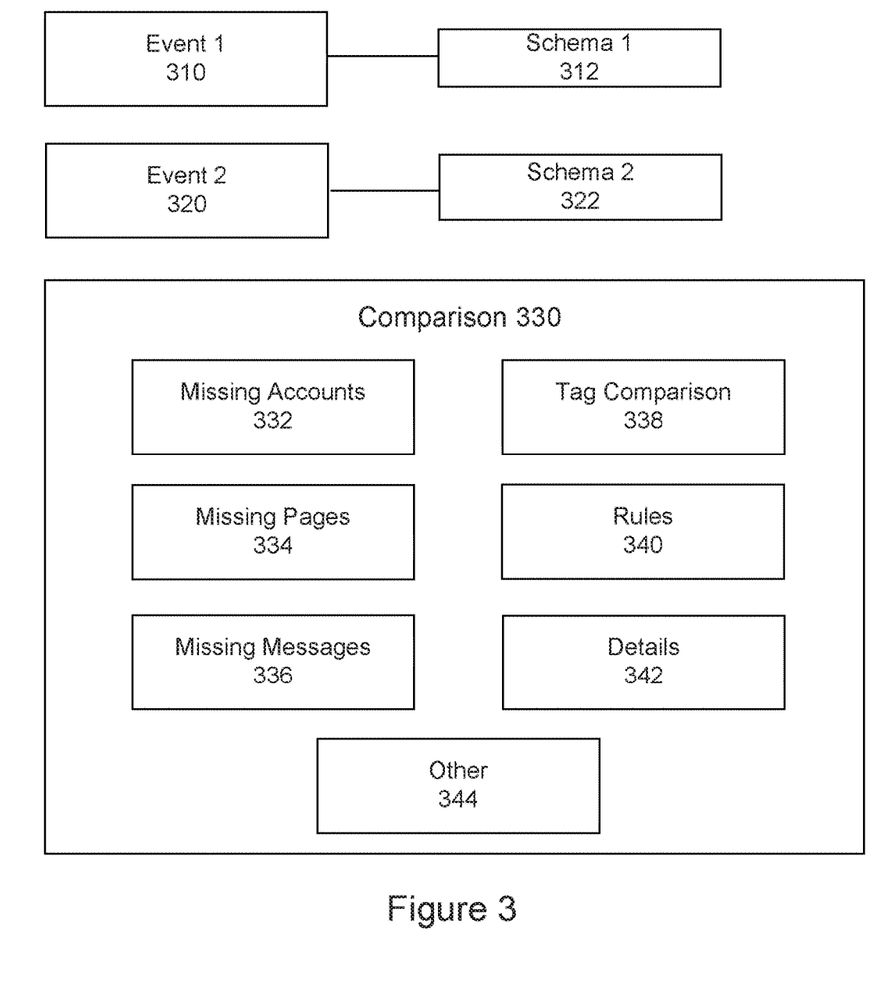
FIG. 3 is an exemplary diagram of a user interface for a Validator Tool, according to an embodiment of the present invention.

FIG. 3 is an exemplary diagram of a user interface for a Validator Tool, according to an embodiment of the present invention. User Interface 300 may be accessible via a mobile device, desktop device and other computing device, processor or system. User Interface 300 may include various modules that perform validation and comparison functionality. For example, User Interface 300 may include inputs that identify events, via Event 1 310 and Event 2 320 as well as inputs to identify corresponding schema at Schema 312, Schema 322. Comparison 330 may be displayed via Missing Accounts 332, Missing Pages 334, Missing Messages 336, Tag Comparison 338, Rule 340 and Details 342. Other features may be displayed at Other 344. These modules are exemplary and illustrative, the User Interface may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention may apply to statements in various formats, including MT statements, XML statements, etc. The Validator Tool may apply to formats that include freeform data as well as other unstructured data formats. The Validator Tool may also be implemented in transitioning from one format to another format. Specifically, the Validator Tool may be applied as a conversion tool from MT standard format to XML standard format, for example. Conversions from/to other formats may be realized in accordance with the various embodiments of the present invention.

Figure 4:
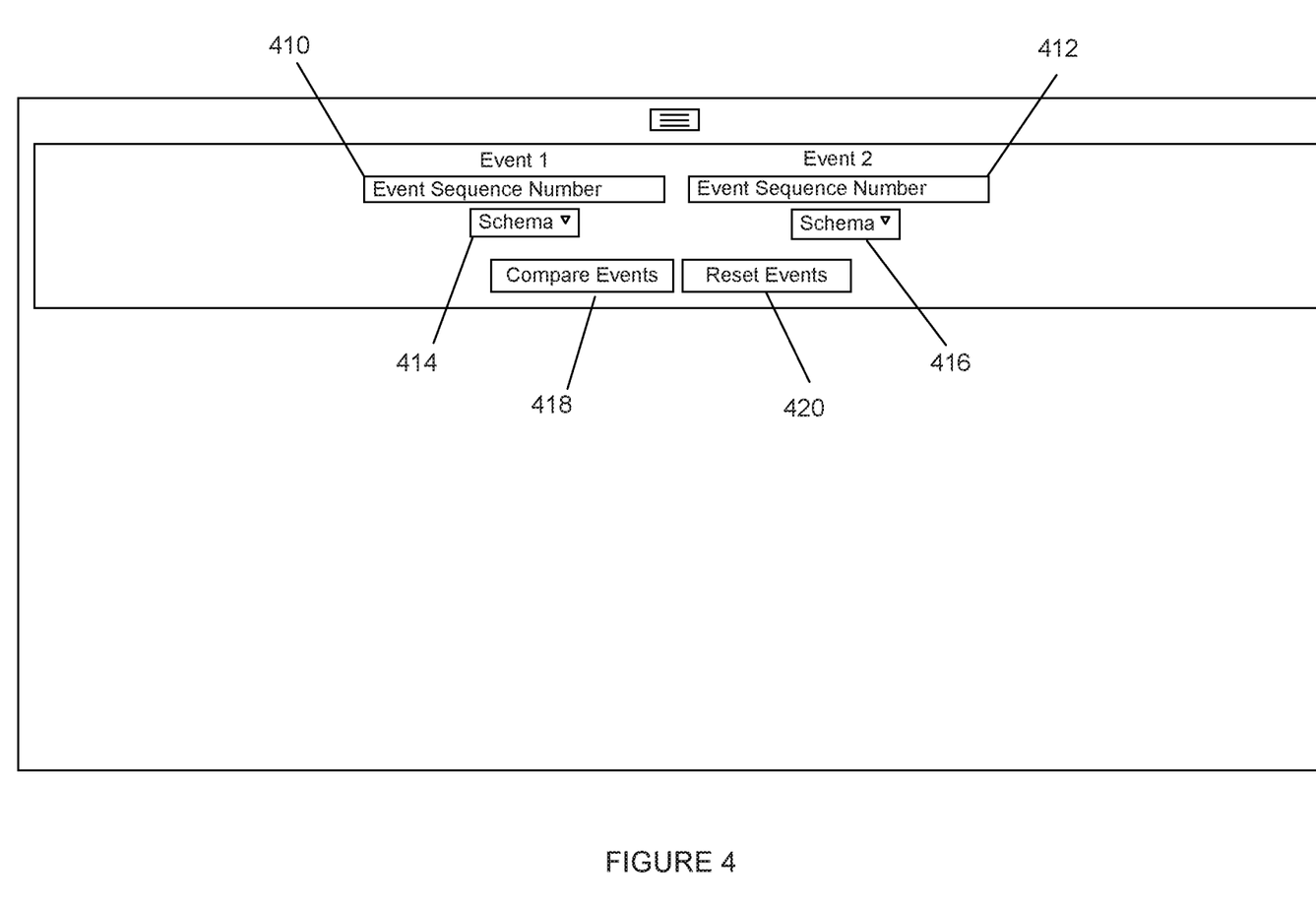
FIG. 4 is an exemplary interface that illustrates a Validator Tool, according to an embodiment of the present invention.

FIGS. 4-7 illustrate exemplary interfaces of a Validator tool, according to an embodiment of the present invention. As shown in FIG. 4, a user may initiate a Validator Tool. According to an exemplary illustration, a user may compare two events. As shown in FIG. 4, the user may enter two event numbers and select the corresponding schema and then initiate a Compare Events function to begin the comparison.

For Event 1, the user may enter an event sequence number for the original (production/before modified) Swift message, at 410. This Event may house multiple Swift messages not just one message. Other identifiers may be provided.

For Event 2, the user may enter an event sequence number for the modified (after code changes) Swift message, at 412. This Event may house multiple Swift messages not just one message as well. Other identifiers may be provided.

In the exemplary illustrations, two events are compared. Additional functionality may be provided that involves multiple comparisons and comparison of additional information and varying levels of detail.

For Schema, each Event may be a database driven event. The user may select the schema where each event is stored, at 414 and 416.

A comparison may be performed by selecting 418. A reset of events may be performed by selecting 420.

Figure 5:
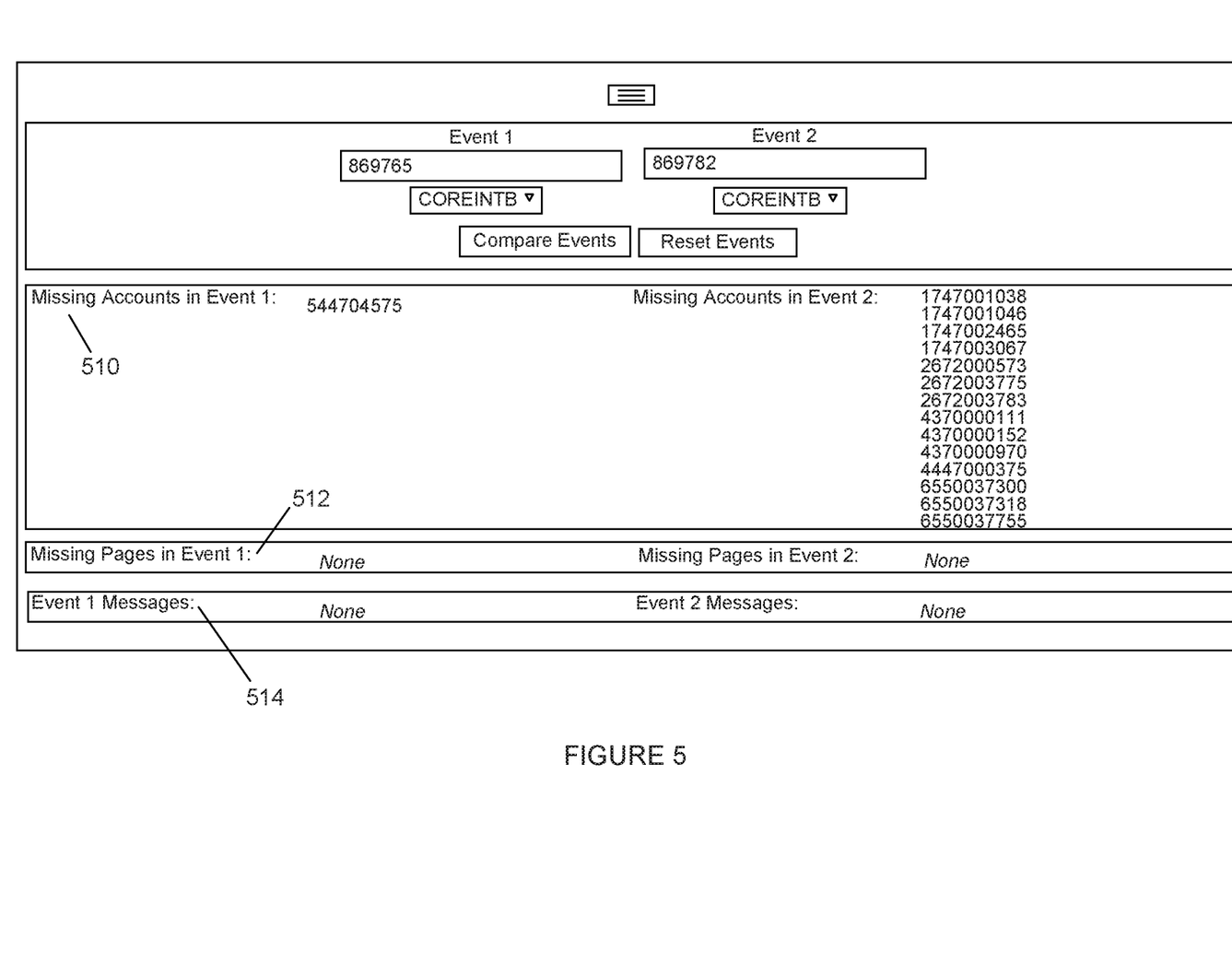
FIG. 5 is an exemplary interface that illustrates a Validator Tool, according to an embodiment of the present invention.

FIG. 5 illustrates comparison results, according to an embodiment of the present invention. Various comparison features may be available, including Detect Missing Account Numbers; Detect Missing Pages; and TAG Comparison. Missing accounts may be illustrated at 510, missing pages may be shown at 512 and event messages may be displayed at 514. Other forms of comparison may be performed by the interactive interface.

Section 510 provides details of missing accounts in Event 1 as compared to missing accounts in Event 2. For Detect Missing Account Numbers, this feature may detect if there are any missing account numbers that exist in one event and not the other, vice versa.

Figure 6:
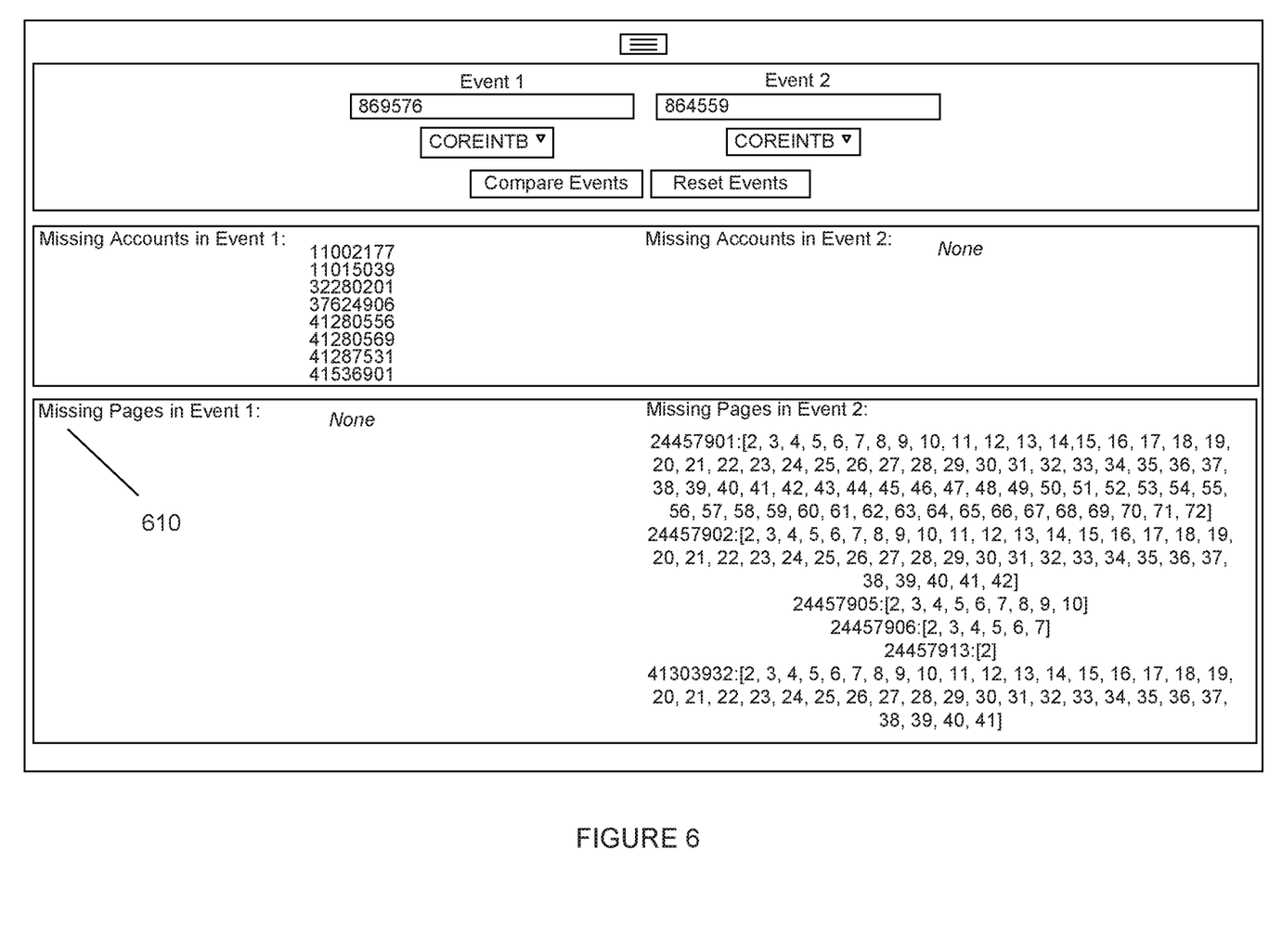
FIG. 6 is an exemplary interface that illustrates a Validator Tool, according to an embodiment of the present invention.

FIG. 6 illustrates comparison results, according to an embodiment of the present invention. Section 610 provides details of missing pages in Event 1 as compared to missing pages in Event 2. For Detect Missing Pages, Swift Messages may be limited to an amount of characters per page. This comparison may provide a quick level validation to detect if any transactions are missing (e.g., lower page count, etc.) or more transactions have been introduced (e.g., higher page count, etc.).

FIG. 7 illustrates comparison results, according to an embodiment of the present invention. Section 710 provides details of Event 1 messages as compared to Event 2 messages. For TAG Comparison, this feature may compare each line for line and then highlight the line that has been impacted from the change. For example, a different in a field may be highlighted with text in a different color (e.g., text in red to indicate a difference). Other graphics and illustrations may be implemented.

Other features may include the ability to validate each SWIFT tag against published Swift Rules. Also, the tool may include the ability to map each transaction on the tag to pull information available for the transaction. For example, the tool may make each TAG61 on the statement clickable to pull various details available.

Other features may include the ability to display impact of going from one statement type to another (TAG comparisons). For example, a client may want to go from MT942 to MT940 (display the TAG differences).

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented Validator Tool that identifies changes in a Swift financial message standard, the tool comprising:
   a memory component that stores financial messaging data;
   an interactive interface that provides a comparison of at least two Swift financial messages; and
   a processor, coupled to the memory component and the interactive interface, the processor configured to perform the steps comprising:
   identifying a change in a Swift messaging format specific to transmission of financial information from a first entity to a second entity;
   identifying a first Swift financial message and a second Swift financial message;
   identifying a first schema associated with the first Swift financial message and a second schema associated with the second Swift financial message; the first Swift financial message in the first schema represent a message prior to the change in the messaging format and the second Swift financial message in the second schema represents a message that incorporates the change in the messaging format; and performing a comparison of the first Swift financial message and the second Swift financial message, wherein the validation tool compares one or more Swift financial message tags and also the data for each of the one or more tags.

2. The computer implemented tool of claim 1, wherein the comparison comprises a comparison at a TAG level on a statement.

3. The computer implemented tool of claim 1, wherein the comparison identifies a difference in a field in a TAG.

4. The computer implemented tool of claim 1, wherein the messaging format is a Swift (Society for Worldwide Interbank Financial Telecommunications) standard.

5. The computer implemented tool of claim 1, wherein the first event is in a Swift format and the second event is in a different Swift format.

6. The computer implemented tool of claim 1, wherein the first event is in a MT statement and the second event is in XML statement.

7. The computer implemented tool of claim 1, wherein the missing accounts identifies a difference in one or more account numbers.

8. The computer implemented tool of claim 1, wherein the missing pages identifies a difference in one or more pages.

9. The computer implemented tool of claim 1, wherein the event message identifies a difference in one or more tags and corresponding fields of data.

10. The computer implemented tool of claim 1, wherein one or more relevant rules are identified, responsive to the comparison.

11. A computer readable medium containing program instructions for validating a messaging format standard, wherein execution of the program instructions by one or more processors of a computer system causes the one or more processors to carry out the steps of:

identifying a change in a Swift messaging format specific to transmission of financial information from a first entity to a second entity;

identifying a first Swift financial message and a second Swift financial message;

identifying, via a processor, a first schema associated with the first Swift financial message and a second schema associated with the second Swift financial message;

the first Swift financial message in the first schema represent a message prior to the change in the messaging format and the second Swift financial message in the second schema represents a message that incorporates the change in the messaging format; and performing, via an interactive interface, a comparison of the first Swift financial message and the second Swift financial message, wherein the interactive interface compares one or more Swift financial message tags and also the data for each of the one or more tags.

12. The computer readable medium of claim 11, wherein the comparison comprises a comparison at a TAG level on a statement.

13. The computer readable medium of claim 11, wherein the comparison identifies a difference in a field in a TAG.

14. The computer readable medium of claim 11, wherein the messaging format is a Swift (Society for Worldwide Interbank Financial Telecommunications) standard.

15. The computer readable medium of claim 11, wherein the first event is in a Swift format and the second event is in a different Swift format.

16. The computer readable medium of claim 11, wherein the first event is in a MT statement and the second event is in XML statement.

17. The computer readable medium of claim 11, wherein the missing accounts identifies a difference in one or more account numbers.

18. The computer readable medium of claim 11, wherein the missing pages identifies a difference in one or more pages.

19. The computer readable medium of claim 11, wherein the event message identifies a difference in one or more tags and corresponding fields of data.

20. The computer readable medium of claim 11, wherein one or more relevant rules are identified, responsive to the comparison.

* * * * *